United States Patent [19]

Joslin

[11] Patent Number: 4,522,692
[45] Date of Patent: Jun. 11, 1985

[54] ELECTROCHEMICAL MACHINING A WORKPIECE UNIFORMLY USING A POROUS ELECTRODE

[75] Inventor: Frederick R. Joslin, Lebanon, Conn.

[73] Assignee: United Technologies Corporation, Hartford, Conn.

[21] Appl. No.: 517,315

[22] Filed: Jul. 26, 1983

[51] Int. Cl.³ .............. B23P 1/14; B23P 1/00; C25F 7/00
[52] U.S. Cl. .............. 204/129.5; 204/129.7; 204/284; 204/224 M
[58] Field of Search .............. 204/129.5, 129.7, 129.6, 204/284, 129.35, 224 M

[56] References Cited

U.S. PATENT DOCUMENTS

| | | | |
|---|---|---|---|
| 3,041,265 | 6/1962 | Williams | 204/224 M |
| 3,058,895 | 10/1962 | Williams | 204/284 X |
| 3,247,087 | 4/1966 | Gauthier | 204/143 |
| 3,257,300 | 6/1966 | Williams | 204/129.35 |
| 3,271,281 | 9/1966 | Brown et al. | 204/284 X |
| 3,276,988 | 10/1966 | Williams | 204/284 |
| 3,399,125 | 8/1968 | Mikoshiba et al. | 204/129.7 |
| 3,498,904 | 3/1970 | Williams | 204/284 |
| 3,723,268 | 3/1973 | Johns et al. | 204/129.1 |
| 3,990,959 | 11/1976 | Payne et al. | 204/129.5 X |
| 4,227,703 | 10/1980 | Stalker et al. | 277/53 |

FOREIGN PATENT DOCUMENTS 806339  2/1981  U.S.S.R. .............. 204/224 M

Primary Examiner—Donald R. Valentine
Attorney, Agent, or Firm—C. G. Nessler

[57] ABSTRACT

Electrochemical machining of ceramic particulate and metal matrix surfaces, and of other uneven or discontinuous surfaces, is conducted using an electrode which has a porous metal working face. Relatively low electrolyte pressures of the order of 5 kPa and low flow rates of the order of 6 ml/s/cm² of electrode surface are used. Preferably the electrode face is made of sintered powder. Facing the electrode upward and the workpiece surface downward enables machining of workpieces without unwanted flow of electrolyte onto areas away from the machined surface.

7 Claims, 6 Drawing Figures

ELECTROCHEMICAL MACHINING A WORKPIECE UNIFORMLY USING A POROUS ELECTRODE

DESCRIPTION

1. Technical Field

The present invention relates to electrochemical machining, particularly to the uniform machining of metal-ceramic composites 2. Background Art Electrochemical machining (ECM) has been widely used in the gas turbine industry to machine tough alloys. Over the past two decades, there has been considerable progress with respect to machinery and specialized techniques for particular materials. Still, new demands arise from time to time, and the present invention arose from the search for a solution to a particular problem.

The tips of superalloy turbine blades in gas turbine engines occasionally come in contact with the circumscribing air seal. When this occurs, the mode of interaction and wear between the components must be controlled. As a result, specialized materials have been applied to the tip of the blade, to act as an abrasive when in contact with the air seal. Owing to the high temperatures and severe environment, most conventional abrasives are not suitable. An abrasive material which has been found to be useful is comprised of a metal matrix containing a multiplicity of ceramic particulates; specifically, a nickel or cobalt alloy matrix containing particulates of silicon carbide. U.S. Pat. No. 4,249,913 to Johnson et al, commonly owned by the present assignee, describes such a material, and the disclosure thereof is incorporated by reference. See also U.S. Pat. No. 4,227,703 to Stalker et al.

It is now appreciated that to enhance the performance of these specialized abrasive materials, the ceramic grains on the tips of the turbine blades should be exposed, or relieved of their surrounding matrix material, so that they project slightly above the surface of the matrix. Inasmuch as the abrasive is a composite of ceramic and metal and since the metal is a relatively complex superalloy, it is not a simple matter to uniformly remove the matrix. About 0.15 mm of matrix material has to be removed, but the removal must be uniform in depth across the surface and from one blade to the next, and the removal technique must not substantially undercut the silicon carbide grains. Areas of the superalloy blade adjacent the abrasive should not be attacked.

Simple chemical milling works but is not optimal owing to the complexity of the alloy and the selective attack of different phases. Furthermore, chemical milling is slow. ECM is preferred because it is a high rate production process.

In conventional ECM, an electrode is placed in proximity to the workpiece and an electric potential is placed across the electrode and the workpiece. Electrolyte is forced into the gap between the electrode and the workpiece, and as material is removed, the electrode is advanced toward the workpiece. Typically, the electrode is hollow and the electrolyte flows internally along the electrode, issuing through a hole, slot, or some other like aperture at the working face of the electrode. However, in such an instance there will tend to be left on the surface of the workpiece a small protuberance at the vicinity of the orifice through which the electrolyte issues. See FIGS. 1 and 3 of U.S. Pat. No. 3,723,268 to Johns et al. In most instances, these protuberances are not a problem. But in certain situations where blind holes are drilled, supplemental machining operations must be used to remove the protuberance and achieve a flat bottomed hole. In the removal of matrix from the silicon carbide and metal composite material, an electrode which leaves protuberances or substantial local high spots is not acceptable. Of course, the electrolyte need not be introduced through the internal passages of the ECM electrode but instead can be cross flowed through the gap. However, such procedures require often times complex apparatus to channel the flow across the end of the electrode.

In both the conventional procedures there is a further tendency for uneven matrix removal since the insoluble ceramic grains create stagnant electrolyte flow areas. It has been found that temperature rise and other adverse effects in stagnation areas will tend to produce undercut or uneven removal of matrix. The dissimilar electrical properties of the ceramic and metal further complicate analysis of what occurs during ECM.

DISCLOSURE OF INVENTION

It is an object of the invention to provide an improved method of electrochemical machining where very uniform surfaces must be produced in metals and where small amounts of material must be removed from metal-ceramic composites.

The invention involves the use of an electrode with a plurality of small passages on its working face. Preferably, the end of a hollow electrode is closed by a porous powder metal sheet. In use, electrolyte flows through a relatively large interior passage and then through the porous working face of the electrode. It then exits from the gap between the electrode face and the workpiece surface being machined. Because of the relation between the electrode working face and the sizes of the interior electrode passages and the gap, the principal pressure drop in the electrolyte flow path is across the working face of the electrode. This means that flow rate is relatively insensitive to the gap. Thus, when the electrode is used to remove matrix material from a surface comprised of insoluble ceramic particulate and metal, the electrolyte and current are both evenly distributed over the surface of the workpiece. Similarly, use of the electrode converts uneven surfaces, such as those made by a conventional ECM electrode with a large central passage to an even surface.

In the preferred practice of the invention the electrode working face is made of sintered powder metal sheet of the type commonly used for filtering. Such sheets have nominal particle size capture ratings of 20-100 micrometers, but the individual fluid discharge ports on the working face will range up to four times the nominal rating. The hollow electrode of the invention is configured so that the closure which comprises the working face has an apparent flow path area of less than 50% of the interior channel of the electrode body which is immediately upstream of the closure.

When machining composite ceramic particulate and metal abrasive materials, the size of the fluid discharge ports on the working face will be equal or less than the nominal size of the particulate, to obtain uniform matrix removal. Generally, the gap between the electrode and the workpiece will range from 0.05-0.5 mm, most preferably at about 0.38 mm. In this range, with the preferred 100 micrometer powder metal electrode, and a constant flow rate in the range of about 6 ml/sec/cm² the pressure drop across the electrode will be always two times or greater than the pressure drop in the gap, which of course is greatest for the minimum gap dimension.

Because of the even distribution of electrolyte which is obtained relatively low electrolyte pressures, of the order of 2.5-7.5 kPa (~25-75 cm of water column) are usable. Thus, instead of jetting from the electrode face, the electrolyte tends to seep. When machining the tip of a turbine blade or other article, unwanted attack away from the working face is prevented by disposing upwardly the electrode working face. Electrolyte discharged from the gap flows downward and away from the workpiece. In the preferred practice of this aspect of the invention the electrolyte pressure is in the range of 2.5-7.5 kPa and the flow rate is in the range 3-8 ml/sec/cm².

Compared to conventional ECM techniques the invention produces uniform finish surfaces and minimizes extraneous workpiece attack. The foregoing and other objects, features and advantages of the present invention will become more apparent from the following description of preferred embodiments and accompanying drawings.

BEST MODE FOR CARRYING OUT THE INVENTION

The invention is described in terms of the removal of a portion of the matrix metal from a composite material comprised of silicon carbide particulates dispersed in a high temperature alloy of nickel or cobalt, such as are described in the Johnson U.S. Pat. No. 4,249,913, mentioned in the background. Because of its function on a gas turbine blade, this material is referred to herein as an abrasive; but the appelation will be understood to refer to any composite of ceramic particulate and metal.

It will be apparent that the invention is relevant to other materials and other configurations of articles.

Figure 1:
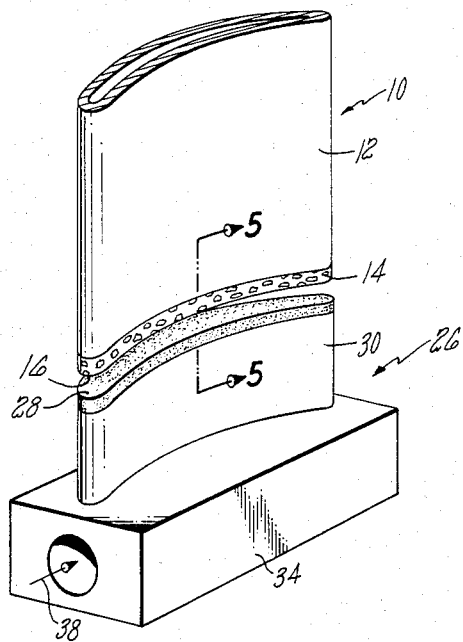
FIG. 1 shows how the tip of a turbine blade is electrochemically milled using a porous metal tipped electrode facing vertically up.
Figure 2:
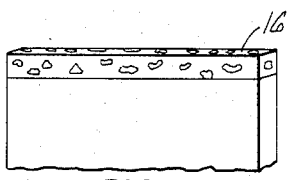
FIG. 2 shows a composite material of ceramic particulates and metal matrix composite material prior to machining.
Figure 3:
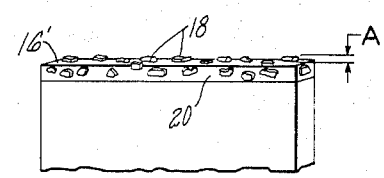
FIG. 3 shows the material of FIG. 2 after electrochemical machining to remove some of the matrix and uniformly expose the grains.
Figure 6:
FIG. 6 is a photograph of silicon carbide particulate in a nickel alloy matrix after 0.15 mm of matrix has been removed from a flat ground surface.

The essential processes of electrochemical machining (ECM) are described in the aforementioned U.S. Pat. No. 3,723,268 and in the book by J. F. Wilson, "Practice and Theory of Electrochemical Machining", Wiley-Interscience, New York (1971). A blade 10 comprised of a hollow body 12 and an abrasive closure 14 at its tip is shown in FIG. 1, as it is positioned for electrochemical machining. FIG. 2 shows in simplified fashion how the blade tip appears prior to ECM. The surface 16 of the abrasive has been ground to a precise dimension which may be curvilinear or planar. FIGS. 3 and 6 show how the same structure appears after processing according to the method of the invention. The ceramic particulates 18 project above the matrix metal 20 by an amount A, owing to removal of some of the matrix metal from the surface.

Figure 4:
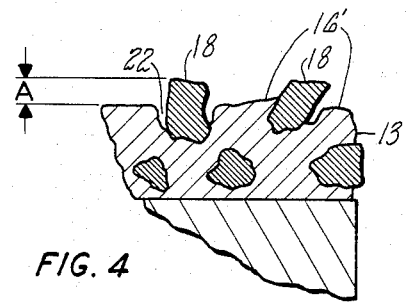
FIG. 4 shows in more detail a structure like that of FIG. 3 but instead illustrates the types of defects which occur when electrochemical machining is not done correctly.

FIG. 4 illustrates in detail what happens when ECM is not properly carried out in accord with the invention. All the defects in the Figure may not occur on the same workpiece, but they are shown here in one illustration for convenience. In one deviation, the particulates 18 are surrounded by moats; i.e., they are undercut by selective localized attack of the matrix metal. In a second type of defect, the surface 16 of the matrix metal is uneven across the surface of the workpiece, meaning that the degree of exposure of the various particulates is uneven. In the third type of defect, the side 13 of the abrasive has been electrochemically attacked. All such defects can be deleterious to the performance of the component. When the particulates are undercut, they tend to easily pull out. When the matrix is uneven, the abrasive does not function uniformly across its surface; i.e., the desired effects of controlled removal of the matrix are not obtained. When the workpiece is selectively attacked at regions away from the surface, such as the side, it is potentially weakened.

Figure 5:
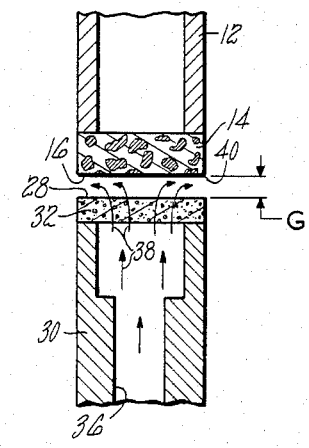
FIG. 5 is a partial cross section through the parts shown in FIG. 1.

FIGS. 1 and 5 illustrate how the invention is practiced. An electrode 26 is configured with a working face 28, shaped according to the area which it is desired to electrochemically machine. The electrode 26 has a hollow body 30 to which is attached a closure 32 made of a porous sintered metal, such as an AISI 316 stainless steel 100 micron metal filter element. The electrode 26 has interior portions or passages 34, 36 adapted to convey electrolyte through the interior of the electrode to the porous closure, as indicated by the arrows 38. The electrolyte passes through the closure 32 and is discharged towards the workpiece face 16. The workpiece face 16 is spaced apart from the face 28 of the electrode by a gap G. During ECM of the surface 16, current is applied between the electrode and the workpiece. When a small amount of surface material is to be removed, such as 0.02-0.15 mm, the electrode and workpiece are fixed with respect to one another. When more material is desired to be removed from the workpiece, in instances other than those described for the abrasive herein, then the electrode would advance toward the workpiece as removal of material from the workpiece tended to increase the gap G.

The cross-sectional area of the passage 36 which feeds electrolyte to the closure is greater than the summation of cross-sectional areas of the porous metal closure passages. Therefore, the porous metal closure acts as a metering device. The primary pressure drop along the electrolyte flow path, from inside the electrode body, through the closure, and out the gap is caused to occur at the closure. The flow area of the closure is related to the gap G so that there is relatively little pressure drop in the electrolyte in the gap. As an example, a total pressure of 2.5-7.5 kPa (about 0.3-1 m water column) is supplied when the electrode is a 100 micron filter element (described in more detail below). With this pressure, the electrolyte gently oozes from the surface of an upward facing electrode working face, forming a meniscus layer of about 1 mm thick. Since the principal pressure drop is across the electrode closure, the flow at different locations across the working face 28 is relatively uniform regardless of whether a workpiece is present or not. This is in contrast to the situation with a conventional electrode having very few large electrode face passages, where the change in the distance G, either by movement or variation in electrode position, or by erosion of the workpiece, will affect the electrolyte flow. And flow at one location on the electrode face will, by its increase or decrease, affect conversely the flow at another location in the workpiece surface.

In the invention, since the porous metal closure causes a relatively high pressure drop of a rather low absolute value, and since the flow is relatively constant, when the workpiece is mounted vertically above the electrode, the electrolyte will fall vertically downward upon issuing from the gap. This prevents unwanted attack of the portions of the workpiece away from the working surface, such as the part 13 without requiring the necessity of masking. It is also found, probably due to the same effects, that there is comparatively little erosion at the edge 40 of the workpiece, compared to that which is found in conventional ECM, whether electrolyte is flowing through the electrode or across the gap from an external supply. Notwithstanding the foregoing, in the best practice of the invention lacquer or other impermeable membrane is applied to the surface 13 as a matter of prudence.

The following more particular descriptions exemplify the practice of the invention when machining an abrasive. The abrasive is comprised of about 30–45 volume percent alumina coated silicon carbide particulate sized between 0.2–0.6 mm, preferably between 35–45 U.S. sieve series size (0.495–0.351 mm opening) in a matrix of nickel or cobalt superalloy, preferably an alloy of U.S. Pat. No. 4,152,488 to Shilke et al (which is hereby incorporated by reference). The abrasive is made by hot pressing or plasma spraying processes. The particulate is coated with a nonconductive oxide such as alumina and therefore the ceramic is not conductive of electricity at the voltages used in ECM. From 0.05–0.20 mm of matrix ordinarily must be removed to expose the particulate and enhance the abrasive properties.

The electrode is comprised of 20–100 micron AISI 316 steel filter element material, such as may be obtained from Mott Metallurgical Corp., Farmington, Connecticut, USA. The micron designation is a measure of the permeability and refers to the minimum particle which is captured from a fluid stream by the material. A sheet of the sintered stainless steel powder material is welded to an electrode body made of compatible material. The thickness of the powder metal closure is chosen according to structural needs and preferably is relatively thin; a 2.3 mm thick piece has been found satisfactory. The working face of the electrode is shaped according to the contour of the workpiece (or that which is desired if the contour is to be changed).

The electrode circumferential dimensions preferably fit the workpiece as shown in FIG. 5, but may be larger or smaller. The electrode is fixedly positioned with respect to the workpiece so the gap G is 0.05–0.5 mm, preferably 0.25–0.38 mm. The electrolyte may be selected from those known in the art. Preferably it is comprised of 0.4 kg/l sodium nitrate in water with caustic soda or nitric acid added as needed to obtain a pH of 7–9. A specific gravity of 1.23–1.25 at 38° C. is maintained during operation by adding water or sodium nitrate. The electrolyte is pressurized to at least 2.5 kPa, as needed to obtain a flow rate of at least 3 ml/sec/cm$^2$ through the electrode working face. Higher pressures are needed with finer pore size electrodes. For a 100 micron electrode material the preferred flow rate of 6.5 ml/sec/cm$^2$ is obtained with an upstream pressure of about 5 kPa. The electrolyte is filtered, preferably with a 0.45 micron absolute membrane final filter (such as a Type 12571 Filter, from Gelman Sciences Company, Ann Arbor, Michigan) to avoid particulates which may cumulatively plug the electrode during use.

A constant voltage power supply is connected across the gap. For the above-mentioned preferred material and parameters, a voltage of 10.5 v will be applied, producing an initial current of about 11 a/cm$^2$, decreasing to about 9 a/cm$^2$ as matrix is removed and the effective gap widens from the starting point of 0.38 mm to the final 0.51 mm. Different voltages and current densities may be used to vary the rate of removal. However, the current density is desirably maintained in the generally low range indicated, so that the exiting electrolyte temperature does not heat to greater than about 50–60° C.

With respect to the foregoing ranges, limited experiments have been run. As electrodes, filter element materials having nominal ratings of 0.5, 2, 10, 20, 40 and 100 microns were tested and found usable. However, those less than 20 microns are more prone to eventual plugging and are to be avoided. About 35–50% of the working face area of an electrode made of the preferred 20–100 micron material is the electrolyte passage exit area, based on the typical porosity of the powder metal material. The passages tend to be larger in nominal diameter than the nominal micron rating. Thus a 100 micron material may have passage exits of varying dimension, from very small to up to ~400 microns. However, as indicated in connection with the Table below, the tortuous flow path through the powder metal closure provides a pressure drop substantially greater than the apparent porosity would suggest. The upper size limit of usable electrode closure was not determined but if the passages become too big then irregular surface finishes will eventually be obtained, as are obtained with electrodes having a single large central port. In the present invention the ceramic particulates are nominally 350–500 micron diameter and thus the preferred electrode nominal passage size is equal or less than the particulate size. This means not only that there will be even discharge of electrolyte, but that there will be no significant areas, on the scale of the particulate, where there will be an absence of conductive electrode material due to the presence of an electrode passage opening on the working face. In summary, the multiplicity of passages smaller than the size of the particulate ensures even distribution of electrolyte and even distribution of electrical current.

While a porous sintered powder metal is easiest to fabricate, the closure in my invention can be made by other means, such as by drilling a multiplicity of very small holes through the surface of a solid piece of metal. In such an instance, the diameter and spacing of the holes would approximate the surface characteristics of the powder metal which we described above. And of course the electrode may be made of other materials, such as copper, brass, and the like, as are known to be useful in ECM electrodes.

Electrolyte flow through the electrode working face can ordinarily be affected by the gap during machining. The gap must be great enough to ensure that the predominate pressure drop is through the electrode and not in the gap. Thus in the exemplary case of the 100 micron electrode, the gap should not be less than 0.05 mm and desirably is 0.38 mm. Table 1 shows data illustrative of standard sodium nitrate electrolyte flow behavior for an electrode which was airfoil shaped the same as the workpiece. The cross-sectional area of the electrode working face was about 4.5 cm$^2$ and the peripheral length was about 120 mm, meaning that for a 0.38 mm gap the peripheral discharge area was about 0.45 mm$^2$, substantially less than the working face area.

TABLE 1

| Electrolyte flow Path Pressure Drop For Different Gaps At Constant Flow Rate | | | |
|---|---|---|---|
| Gap (mm) | Total ΔP (kPa) | Electrode ΔP (kPa) | Gap ΔP (kPa) |
| ∞ | 5 | 5 | — |
| 0.38 | 5.5 | 5 | 0.5 |
| 0.13 | 6.2 | 5 | 0.7 |
| 0.05 | 7.5 | 5 | 2.5 |

The electrolyte flow was constant at 0.65 ml/s/cm$^2$ and thus the pressure drop (ΔP) across the electrode working face (or closure) was constant at the value measured when no workpiece was present (∞ =0 in the Table). It is seen that the electrode pressure drop is always more than two times the gap pressure drop, even for the very small 0.05 mm gap. As a corollary, the data show that if constant pressure were supplied, the system flow will vary conversely to the pressure data. Thus, flow is relatively insensitive to gap within the overall, and especially, the preferred operating range. The preferred starting gap is relatively large at about 0.38 mm when machining the abrasive because with larger gaps there is less sensitivity in current density (and thus material removal) due to planar misalignment of the electrode face with the workpiece face. If the gap becomes too large, substantially greater than 0.5 mm, then the surface velocities of electrolyte characteristic of ECM will not be obtained. Stagnation, heating, and even boiling at the workpiece surface may be encountered. The process will be converted into one characterizable as electropolishing and current densities will necessarily be lowered, beneath those of about 8 a/cm$^2$ characteristic of ECM. Generally, I have found that when the gap is smaller than about 0.3-0.4 mm or if there is insufficient flow of electrolyte, there will be a tendency for undercutting of the particulate and uneven removal. That is, there is preferential removal of material proximate the grains. I attribute these results to the peculiar electrical character of the ceramic-metal material. Additionally, while on a macro-scale the particulate is uniformly distributed in the matrix, on a micro-scale there are regions between small aglomerations of particulates where stagnation of electrolyte takes place, as can be seen in FIG. 6.

In the invention, the even distribution of electrolyte obtained by the great many closely spaced orifices of the electrode permits the use of unusually low flows. These enable low resultant exit velocities from the gap, which combined with the orientation of electrode and workpiece, prevent the electrolyte from flowing around the workpiece and causing unwanted, extraneous attack.

As described, the inventive electrode is useful for removing material used uniformly from any surface. Thus, if uniform bottomed blind holes are desired, an electrode can be accordingly shaped and plunged into a workpiece. For various reasons, it may be desirable to use the more conventional type of electrode having a large hollow internal passage which discharges fluid at a high velocity and flow rate, compared to that which is possible with the powder metal cap. Using this, a blind hole which has a small raised portion in the center will be created. To eliminate the protuberance and provide a flat bottom hole, the first electrode is removed when the desired depth is virtually achieved. Then, an electrode according to the invention is placed into the hole. This second electrode will have a shape similar to the first electrode, or a shape which is smaller but sufficient to encompass the area where the raised protuberance is. Then, ECM will be conducted to remove the protuberance and smooth the bottom of the hole. Thus, the advantages of high production using conventional electrodes are achieved while obtaining a more uniform shaped cavity than heretofore possible.

Although this invention has been shown and described with respect to a preferred embodiment, it will be understood by those skilled in this art that various changes in form and detail thereof may be made without departing from the spirit and scope of the claimed invention.

I claim:

1. An electrode for electrochemical machining comprised of a conductive body having an interior portion shaped for conveying electrolyte to the tip of the electrode and a porous conductive closure covering the tip of the electrode, the closure allowing electrolyte to flow from the interior portion to the exterior portion of the electrode, the porous closure having a plurality of through holes of less than 400 micrometer exit diameter and the cross-sectional flow area of the hole exits at the exterior surface of the closure being less than 50 percent of the cross-sectional area of the closure.

2. The electrode of claim 1 characterized by a sintered powder metal closure.

3. The electrode of claim 1 characterized by a powder metal closure having a filtration rating of 20-100 micrometers.

4. The electrode of claim 1 characterized by a closure having a flow rate in the range of 3-8 ml/sec/cm$^2$ when the pressure drop across the closure is in the range of 2.5-7.5 kPa.

5. An electrode for electrochemical machining comprised of a conductive body having an interior portion for conveying electrolyte to the tip of the electrode and a porous conductive closure covering the tip, the closure made of porous powder metal having a porosity of 35-50 percent.

6. The process of electrochemically machining a workpiece to remove material uniformly therefrom, wherein an electrode has a working face spaced apart by a gap from the workpiece surface and wherein electrolyte is flowed under pressure through the electrode working face and then through the gap, characterized by an electrode working face made of a porous powder metal filter element material having a filtration rating in the range of 20-100 $\times 10^{-6}$ m and by flowing the electrolyte through said working face, the pressure drop of the electrolyte through the portion of the electrode which comprises the working face being greater than the pressure drop of the electrolyte within the gap.

7. The method of claim 6 wherein the electrolyte is provided to the upstream side of the electrode working face at a pressure of 2.5-7.5 kPa.

* * * * *